G. G. BABICH.
BURIAL VAULT.
APPLICATION FILED MAY 23, 1916. RENEWED OCT. 20, 1917.

1,267,495.

Patented May 28, 1918.
3 SHEETS—SHEET 1.

Inventor
George G. Babich
By Frederick V. Winters
Attorney

G. G. BABICH.
BURIAL VAULT.
APPLICATION FILED MAY 23, 1916. RENEWED OCT. 20, 1917.

1,267,495.

Patented May 28, 1918.
3 SHEETS—SHEET 2.

Inventor
George G. Babich
By Frederick V. Winters
Attorney

G. G. BABICH.
BURIAL VAULT.
APPLICATION FILED MAY 23, 1916. RENEWED OCT. 20, 1917.

1,267,495.

Patented May 28, 1918.
3 SHEETS—SHEET 3.

Inventor
George G. Babich,
By Frederick V. Winters
Attorney

UNITED STATES PATENT OFFICE.

GEORGE G. BABICH, OF NEW YORK, N. Y.

BURIAL-VAULT.

1,267,495. Specification of Letters Patent. Patented May 28, 1918.

Application filed May 23, 1916, Serial No. 99,309. Renewed October 20, 1917. Serial No. 197,739.

*To all whom it may concern:*

Be it known that I, GEORGE G. BABICH, a citizen of the United States, residing at New York, in the county and State of New York, having invented certain new and useful Improvements in Burial-Vaults, of which the following is a full, clear, and exact specification.

This invention relates to burial vaults, and has for its object to provide an improved form of portable inclosure for individual caskets which will hermetically seal the same and withstand the efforts of unauthorized persons to obtain access to the casket or its contents. It is also the aim of this invention to provide such an inclosure which can be moved from place to place if desired without exposing the casket or detracting from the sealing quality of said inclosure.

Another object is to provide a simple form of reinforced plastic casing to inclose a casket, in which the reinforcing elements are arranged substantially in the center of the plastic material and positively retained in that position during the pouring of said material in a plastic state and while it is hardening. A further object is to provide an improved form of covering or inclosure for the casket within the plastic casing, for preventing said plastic material from coming into contact with the casket. Another object is to provide an improved outer casing or mold for forming the plastic casing around the casket, said mold being adapted to permit the moisture to rapidly escape from the plastic material without allowing any of the plastic material itself to be lost. Other objects will appear as the description proceeds.

The invention will be first hereinafter described in connection with the accompanying drawings, which constitute part of this specification, and then more specifically defined in the claims at the end of the description.

In the accompanying drawings, wherein similar reference characters are used to designate corresponding parts throughout the several views.

Figure 1:
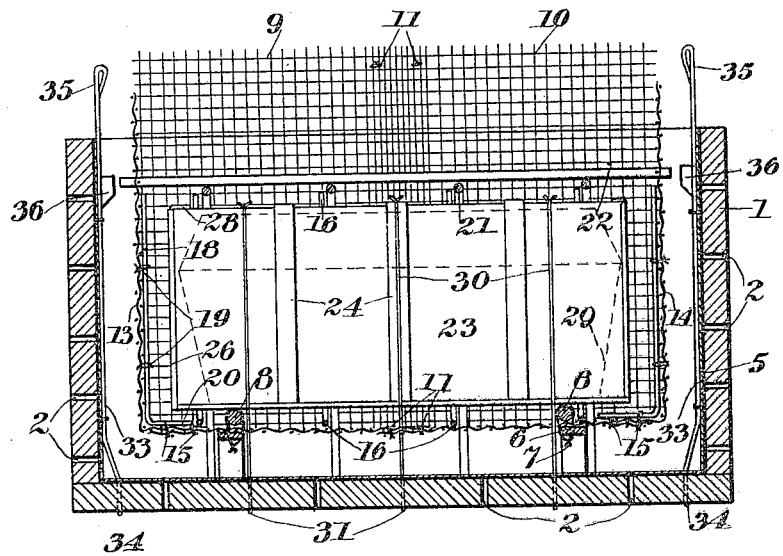
Figure 1 is a longitudinal vertical section through the outer casing or mold, showing the positions of the reinforcing and tying elements after the casket is put in place and before the concrete or other plastic material is poured into said mold.

The outer casing or mold 1 is preferably made of wood, the bottom, sides and ends being perforated, as at 2, and the top 3 being removably held in place by screw eyes 4 which also serve as a means of attachment of the ropes (not shown) for lowering the completed vault into a grave. The mold 1 is lined with cloth or paper 5 which will permit the moisture in the plastic material to quickly escape but will prevent any of the material itself from flowing into or through the perforations 2.

Figure 4:
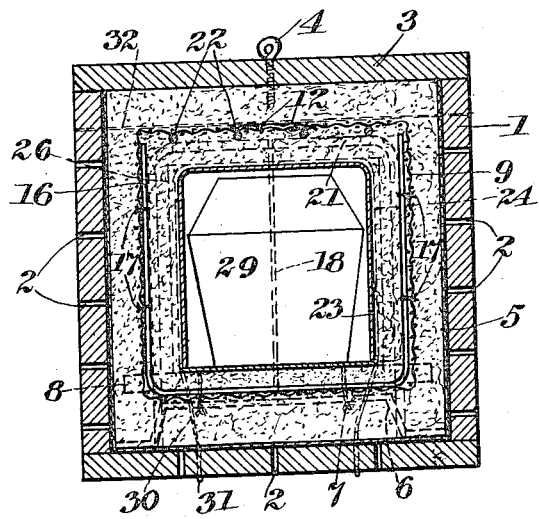
Fig. 4 is a transverse vertical section of the outer casing and its contents, taken on the line IV—IV of Fig. 3.

Supporting brackets 6 are suitably secured to the bottom of the mold 1, and to them the mesh reinforcing material for the plastic inner casing is fastened by tie wires 7, said wires being passed around transverse rods 8 placed along the tops of said brackets and above the bottom of the mesh reinforcing material for the purpose of spacing the casket from the bottom of said mesh material, the latter being spaced from the bottom of outer casing by the brackets. The mesh material as a whole is cross-shaped. It preferably consists of woven wire of comparatively large mesh and is preferably made in four pieces of rectangular shape. Two of these pieces 9 and 10 are secured together edge to edge by tie wires 11 and extend across the bottom and up at the sides of the casket, their upper ends extending well above the casket when the latter is first inserted in the mold, as shown in Fig. 1, and adapted to be subsequently bent down so as to overlap one another as illustrated in Fig. 4, being then secured together by tie wires 12. The two pieces 9 and 10 are employed instead of a single piece in order to provide the extra thickness of the overlapping edges at the middle for increasing the reinforcement of the central portion of the inner plastic casing where it would otherwise be weakest. The other two pieces 13 and 14 of the mesh reinforcing material have their lower ends secured to the outer edge portions of the pieces 9 and 10 by tie wires 15, Figs. 1 and 2, and extend up at the ends of the casket, their upper ends projecting above the casket when the latter is first inserted, and adapted to be bent down so as to underlap the lateral edges of the pieces 9 and 10 when the plastic material is to be poured into the mold, see Fig. 2.

In order to insure the proper spacing of the side portions of the pieces 9 and 10 of the mesh reinforcing material from the sides of the casket, and hold said side portions firmly in position while the plastic material is being poured into the mold, U-shaped rods 16 are secured to the wire mesh material by tie wires 17, Fig. 4. Any suitable number of these U-shaped rods 16 may be employed, four being illustrated as spaced about equidistant apart along the interior of the mold. Said rods are supplemented by L-shaped rods 18 secured by tie wires 19 to the end portions of the wire mesh material, Figs. 1, 2 and 3, which serve to hold these end portions of the mesh material firmly in position about midway between the mold and coffin box while the plastic material is being poured into the mold. Said rods 18 have bottom horizontal portions 20, Figs. 1 and 2, which extend along the bottom of the wire mesh material nearly to the end ones of the U-shaped rods 16, thus providing a very rigid support for the mesh material which is thereby held to a true box form with sides, ends and bottom substantially parallel to the corresponding parts of the mold.

To further reinforce the side portions of the mesh material and also to hold the folded down portions of the material which form the top of said box shaped mesh reinforcing material in place, inverted U-shaped rods 21 are placed over the casket with their legs passed through the bottom portion of the mesh material, and upon the tops of these inverted U-shaped rods a plurality of longitudinal rods 22 are laid. Any desired number of inverted U-shaped rods and longitudinal rods may be used, four of each being shown arranged about equidistant apart. The longitudinal rods are made long enough for their ends to project through the end portions of the mesh material but they terminate short of the ends of the outer mold so that they are entirely enveloped in the plastic inner casing. It will be noted that these longitudinal rods are held in proper spaced relation to each other by reason of their ends being passed through the meshed material.

Figure 5:
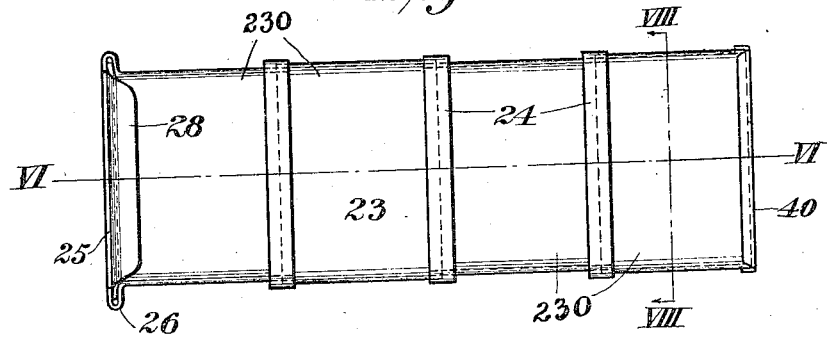
Fig. 5 is a detailed plan view of the metal coffin box.
Figure 6:
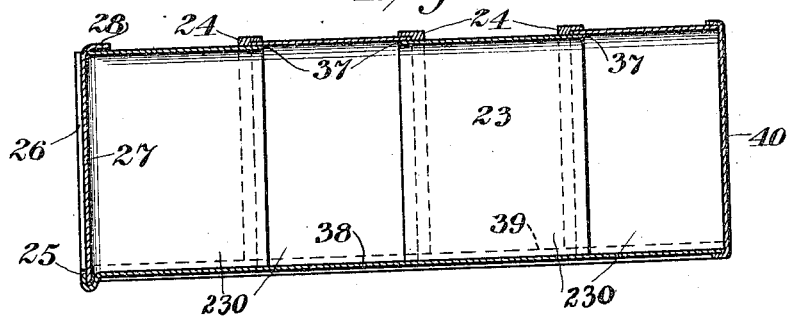
Fig. 6 is a longitudinal vertical section on the line VI—VI of Fig. 5.
Figure 7:
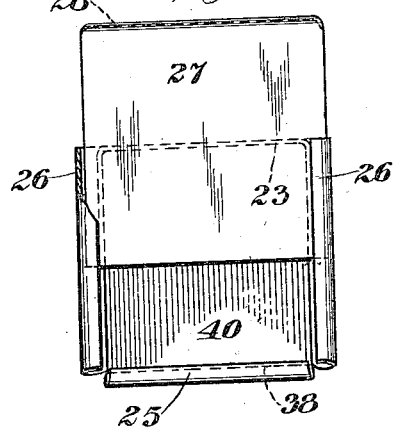
Fig. 7 is a front end elevation showing the closure partly raised.
Figure 8:
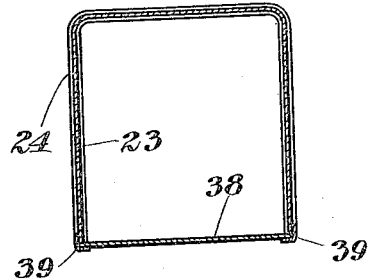
Fig. 8 is a transverse vertical section on the line VIII—VIII of Fig. 5.

The casket 29 is inclosed in a metal coffin box 23, which, as best shown in Figs. 5 and 6, is preferably made up of a plurality of transverse sections 230 having their edges overlapped, as at 37, and forming the sides and top of the coffin box. The bottom 38 of said coffin box is made in a single piece, and the ends of the transverse sections 230 are secured to the edges of the bottom piece 38 by solder or strips 39 making a water tight joint. The overlapping edges of the transverse sections 230 are covered by bands or strips 24 which also make water tight joints between them. One end 40 of the coffin box is permanently closed and sealed, while the other end is provided with a removable closure 27 adapted to slide in grooves 26 formed in the side walls of the coffin box, as clearly illustrated in Figs. 5, 6 and 7. The lower edge of the closure 27 is adapted to fit in a groove formed by the flange 25 at the bottom of the other end of the coffin box. The upper edge of the closure 27 is provided with a turned over flange 28 which serves as a handle for moving the closure into and out of position. After the coffin has been placed in the coffin box, the closure may be soldered or otherwise sealed in closed position. By making the sides and top of the coffin box in transverse sections with overlapping edges covered by the bands 24, the structure is made very strong and capable of resisting the pressure of the concrete placed around it.

Said coffin box is held firmly down upon the rods 8, so as to prevent it from floating when the plastic material is poured into the mold, by a plurality of tie wires 30 passed through the bottom of the mold, as at 31, and having their upper ends twisted or otherwise secured together over the top of the casket box. The upper edge portions of the sides of the mold are connected by tie wires 32, Figs. 2 and 4, which further serve to hold the folded down portions of the mesh reinforcing material in position.

Figure 2:
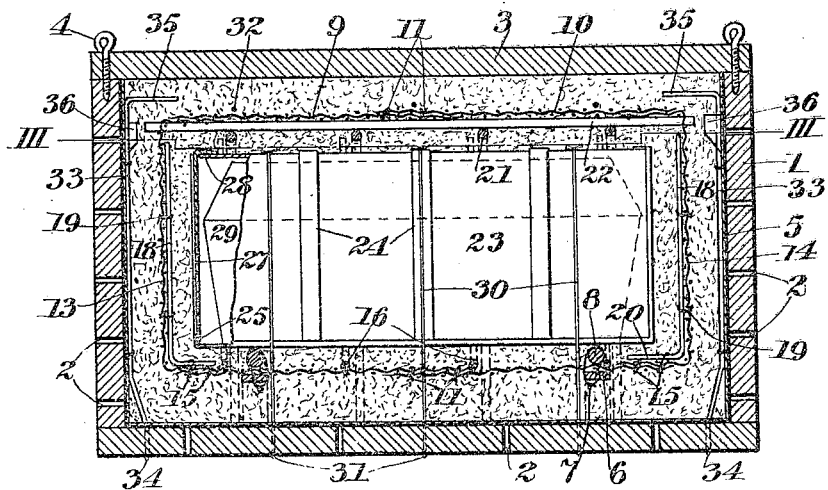
Fig. 2 is a similar section showing the positions of said reinforcing elements after the plastic material is poured in and the cover is secured in position on the mold or outer casing.
Figure 3:
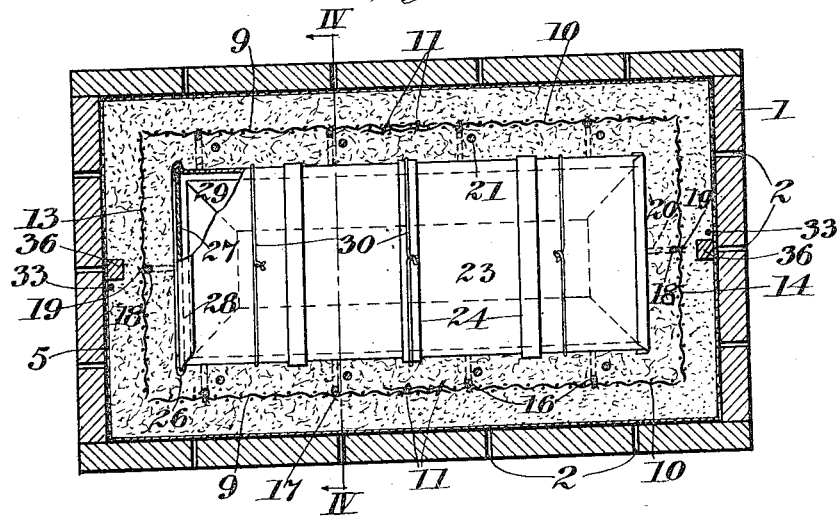
Fig. 3 is a horizontal section on the line III—III of Fig. 2.

To insure the proper settling of the plastic material in the mold, it is desirable to jolt the latter, and for this purpose loops 35 of wire are provided at the ends of the mold. The wires 33 of which these loops are formed extend down the ends of the mold and are passed through the bottom of said mold, as at 34, Figs. 1 and 2. The loops project above the top of the outer casing, as shown in Fig. 1, until said casing or mold is almost filled with the plastic material, after which they are turned down, as shown in Fig. 2, and embedded in the top layer of said plastic material.

Inasmuch as the outer casing or mold is made of wood, it will soon rot away in the ground. To provide for easily raising the plastic casing or block containing the casket and its contents for reburial, blocks 36 are secured to the inner surfaces of the ends of the mold near their upper edges, Figs. 1, 2 and 3, in order to form cavities in the ends of the plastic casing adapted to receive grappling hooks or the like, as will be readily understood.

Having thus described my invention, what I claim as new and desire to secure by Letters Patent of the United States is:—

1. A burial vault comprising an outer casing constituting a mold for forming an inner plastic casing to envelop a casket, a reinforcing element of mesh material surrounding the casket and embedded in the plastic material, U-shaped rods arranged in upright position within the mesh material and extending across the bottom and up the sides of the same substantially midway between the casket and outer casing, and means for securing said U-shaped rods at intervals to the sides of the mesh material for retaining the same in properly spaced position between the casket and outer casing while the plastic material is being poured into the mold.

2. A burial vault comprising an outer casing constituting a mold for forming an inner plastic casing to envelop a casket, a reinforcing element of mesh material surrounding the casket and embedded in the plastic material, L-shaped rods extending along the bottom and up the ends of the mesh material substantially midway between the casket and outer casing, and means for securing said rods at intervals to the ends of the mesh material for retaining the same in properly spaced position between the casket and outer casing while the plastic material is being poured into the mold.

3. A burial vault comprising an outer casing constituting a mold for forming an inner plastic casing to envelop a casket, a reinforcing element of mesh material surrounding the casket and embedded in the plastic material, upright U-shaped rods extending across the bottom and up the sides of the mesh material substantially midway between the casket and outer casing, L-shaped rods extending along the bottom and up the ends of said mesh material substantially midway between the casket and outer casing, and means for securing said U-shaped rods at intervals to the sides of the mesh material and the L-shaped rods at intervals to the ends of said mesh material for retaining the same in properly spaced position between the casket and outer casing while the plastic material is being poured into the mold.

In testimony whereof I have signed my name to this specification.

GEORGE G. BABICH.